United States Patent [19]

Bridson et al.

[11] Patent Number: 4,505,556
[45] Date of Patent: Mar. 19, 1985

[54] ROTATABLE SPECIMEN MOUNT FOR OPTICAL FIBER MICROSCOPES

[75] Inventors: William D. Bridson, Ontario; Edward N. Esmay, Webster, both of N.Y.

[73] Assignee: Bausch & Lomb Incorporated, Rochester, N.Y.

[21] Appl. No.: 460,525

[22] Filed: Jan. 24, 1983

[51] Int. Cl.³ .............................................. G02B 21/26
[52] U.S. Cl. ..................................... 350/532; 269/71; 269/903
[58] Field of Search ............... 350/532, 529, 530, 531, 350/521; 269/71, 77, 78, 82, 903

[56] References Cited

U.S. PATENT DOCUMENTS

| 215,878 | 5/1879 | Bulloch | 350/521 |
| 3,902,784 | 9/1975 | Dakss et al. | 350/530 |
| 4,285,568 | 8/1981 | Elgart | 350/532 |

Primary Examiner—Jon W. Henry
Attorney, Agent, or Firm—John S. Norton

[57] ABSTRACT

A specimen mount for a microscope holds a fiber optic cable so that the end of the cable may be examined. The mount is rotatable to angularly displace the cable end being examined.

6 Claims, 6 Drawing Figures

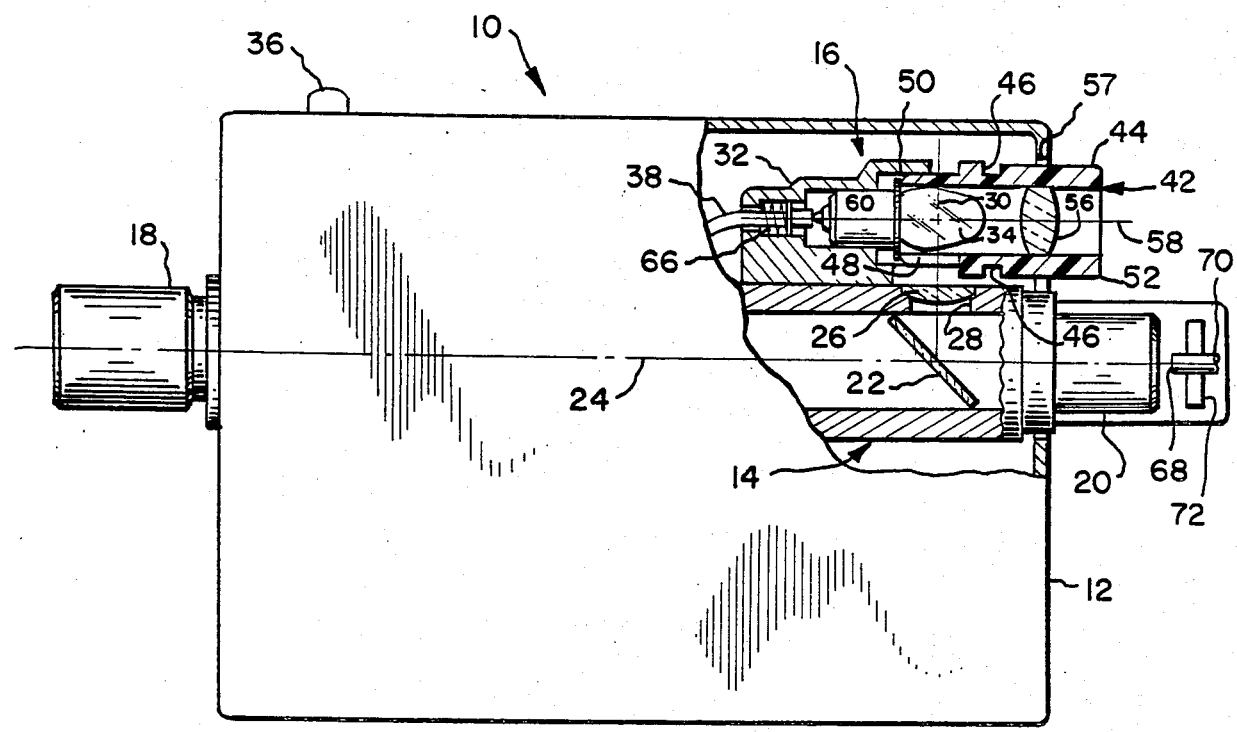
FIG. 1
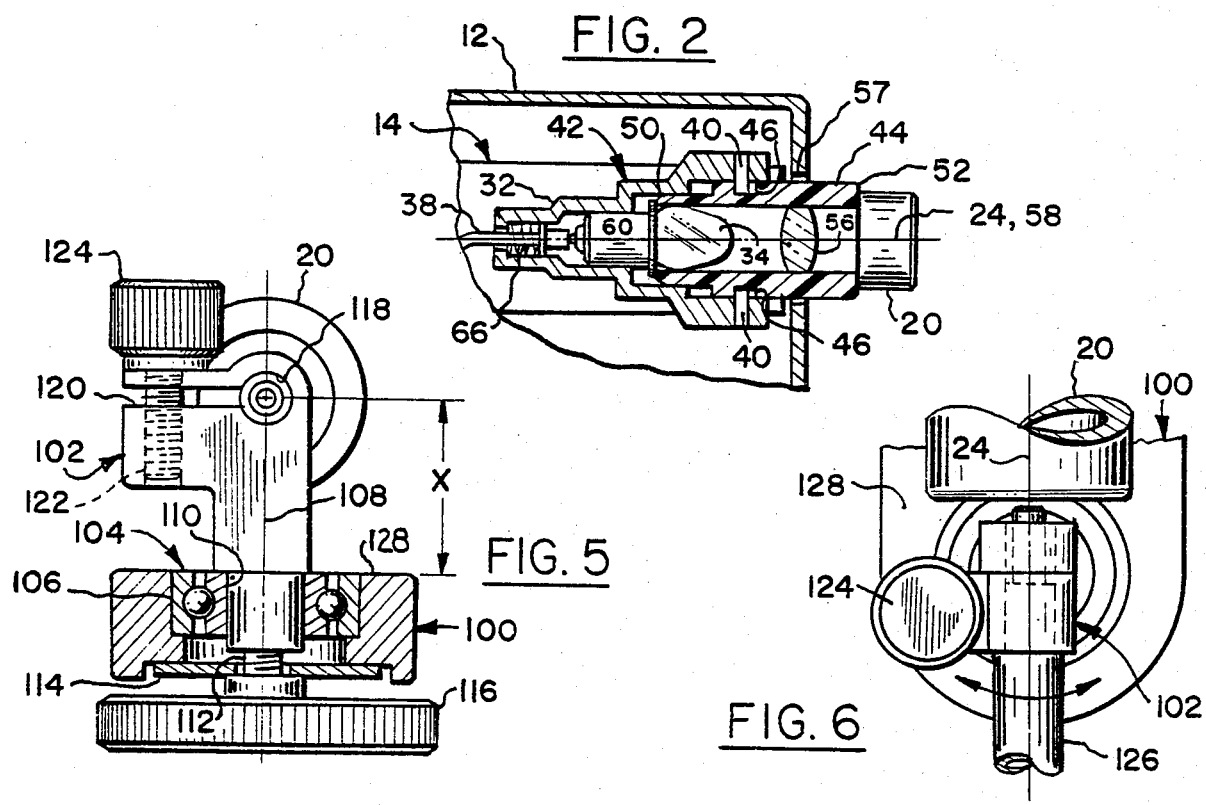
FIG. 2
FIG. 5
FIG. 6

ROTATABLE SPECIMEN MOUNT FOR OPTICAL FIBER MICROSCOPES

CROSS-REFERENCE TO RELATED APPLICATIONS

This application is related to concurrently filed and copending application Ser. No. 460,522 entitled "Portable Illuminated Optical Fiber Microscope" for inventor E. Esmay and to Ser. No. 455,082 entitled "Design For An Optical Fiber Microscope" filed Jan. 3, 1983 for inventor R. Henderson, now U.S. Pat. No. Des. 275,575, issued Sept. 18, 1984.

BACKGROUND OF THE INVENTION

The present invention is directed toward a portable compact microscope for use in examining fiber optic cables.

With the advent of fiber optic cables and, particularly, with their useage in the field of communication, it has become increasingly evident that some means of checking the quality of each fiber optic cable is needed at the point of installation where service personnel will be cutting, polishing and joining the cables, as well as at the point of manufacture.

Up until the present time, it has been the practice of those doing such inspections to employ, for instance, a conventional microscope which has been altered to hold the end of a fiber optic cable. These altered microscopes include no lighting provisions, requiring the service personnel to illuminate the cable with auxiliary lighting. Service personnel who quite often must operate in environmental and lighting conditions which are less than ideal, find the altered microscopes cumbersome and difficult to handle.

An example of a portable microscope which features a self-contained light source may be seen in U.S. Pat. No. 4,361,377 which issued Nov. 30, 1982 to Joel F. Pullen. The subject of this invention is a portable microscope which may be used for examining slides in a medical examination room setting.

SUMMARY OF THE INVENTION

A dual mode microscope illumination system for examining the ends of fiber optic cables in one mode and, in the second mode, examining the entire cable for proper transmission. The microscope has a self-contained light source and an occluder which is movable from one position to another to control the light according to the examination being conducted.

Thus by being able to thoroughly and closely examine the fiber optic cables for proper end finish, as well as optical transmission, the chances of installing a faulty cable are greatly reduced. Conversely, if a faulty cable has already been installed, this device may be used to find it quickly and efficiently.

It will be appreciated that examination of fiber optic cable is especially important at the site of installation where it is necessary for service personnel to cut the fiber cable and polish the end prior to connecting to, for instance, another cable. Presently, the cables must be jointed at distances of approximately every three-quarters of a mile. Obviously, with the use of fiber optic cables growing rapidly, with installation sometimes running into thousands of miles per job, it is imperative that the proper end connections between cables be guaranteed. Also, it is obvious that the optical transmission of the cable to be installed must be inspected before the cable has been installed. The microscope as set forth and described hereinabove provides such capability to service personnel responsible for conducting such examinations.

A specimen mount is provided which enables the fiber optic cable being inspected to be rotated through an arc with respect to the optical axis of the microscope.

The preferred embodiment will be detailed hereinafter.

BRIEF DESCRIPTION OF THE DRAWINGS

FIG. 1 is a partially sectioned plan view of a compact portable microscope for inspecting fiber optic cables;

FIG. 2 is a partial top view of the light occluder/lens assembly shown in FIG. 1;

FIG. 5 is an enlarged partially sectioned front view of a rotatable specimen mount; and FIG. 6 is a top view of the specimen mount of FIG. 5.

DETAILED DESCRIPTION OF THE PREFERRED EMBODIMENT

Figure 3:
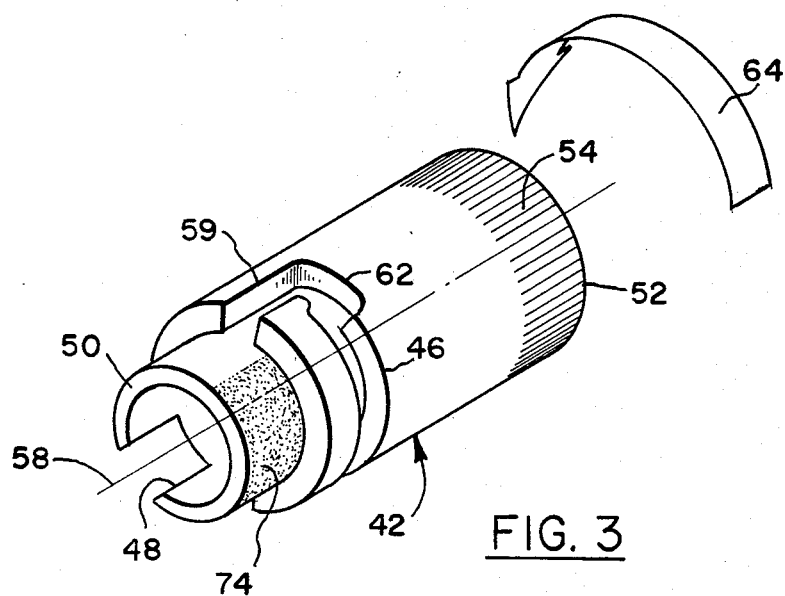
FIG. 3 is a perspective view of the light occluder/lens assembly device shown in FIG. 1.
Figure 4:
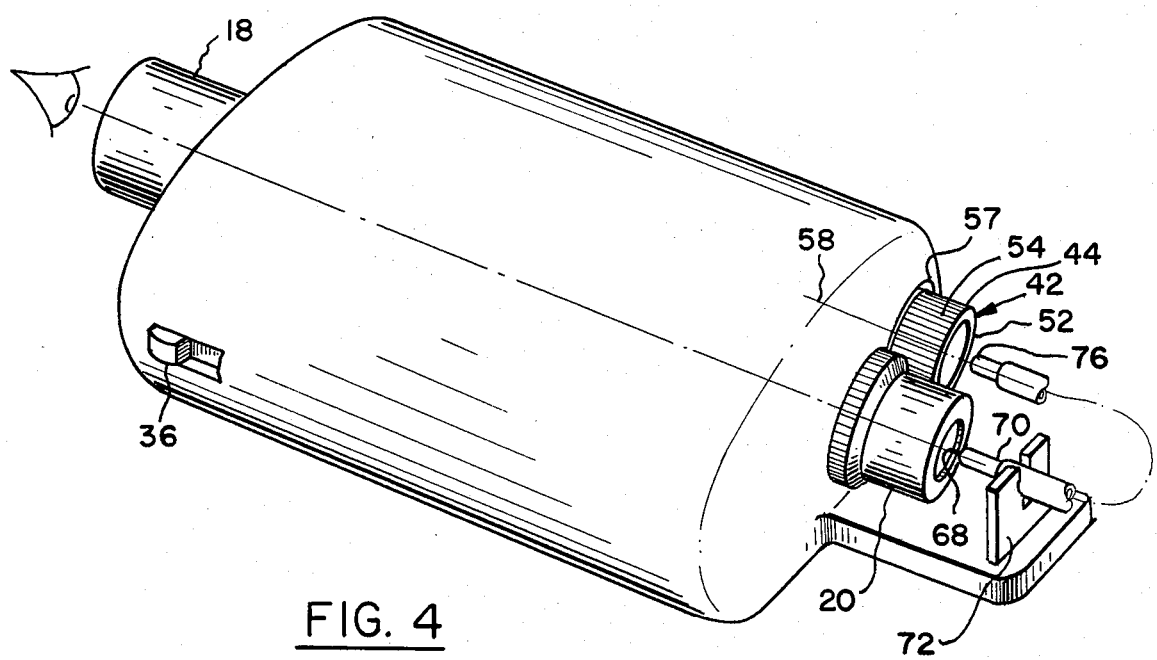
FIG. 4 is a perspective view of the microscope.

A compact portable microscope 10 comprises a housing 12, an optical tube assembly 14 and an illumination system 16. The optical tube assembly 14, which is conventionally known as a straight tube microscope, includes an eyepiece 18 and an objective 20. A beam splitter 22 is mounted in the tube assembly 14 along optical axis 24 between the eyepiece 18 and the objective 20. A diffusing lens 26 is mounted in an aperture 28 in tube assembly 14 along axis 30 which is transverse to axis 24.

The illumination system 16 includes a lamp socket 32 which has a lamp 34 mounted therein. The lamp 34 is connected to a source of power (not shown) and is controllable by switch 36 through wire 38. The lamp socket assembly 32 includes a pair of locating pins 40, as best seen in FIG. 2, which will be more fully described hereinafter.

An occluder/lens assembly 42 includes a tubular body 44 which has a pair of external cam slots 46, one of which is illustrated in FIG. 3. An aperture 48 is formed in tubular body 44 proximate one end 50 thereof. The opposite end 52 has a knurled portion 54. A focusing lens 56 is mounted, or integrally formed in tubular body 44.

The occluder/lens assembly 42 is assembled to lamp socket assembly 32 through housing aperture 57 by aligning locating pins 40 with ramps 59 of cam slots 46, one of which is illustrated in FIG. 3. To assemble, the occluder/lens assembly 42 is pressed inwardly along axis 58 toward the lamp socket assembly 32. Once the locating pins 40 bottom against the rearward edges 62 of cam slots 46, the occluder/lens assembly 42 is rotated in direction of arrow 64 of FIG. 3 to initially align aperture 48 with axis 30, as illustrated in FIG. 1. Wire 38 has a spring biased contact 66 which urges lamp flange 60 against end 50 of occluder/lens assembly 42 which, in turn, exerts pressure against locating pins 40 by cam slots 46. The occluder/lens assembly 42 is thereby held firmly in place with the aperture 48 aligned with axis 30 and diffusing lens 26.

To examine the end 68 of a fiber optic cable 70, the cable would be mounted to, for instance, a fixture 72 which would align the end 68 with respect to objective 20. Switch 36 would be turned on to supply power to lamp 34. Light emitted by lamp 34 passes along axis 30 through aperture 28 and diffusing lens 26 to beam splitter 22 where it is directed along axis 24 between the eyepiece 18 and objective 20. The incident light emitted illuminates the end 68 of the fiber optic cable 70 so that it may be examined for flaws. The diffusing lens 26 which is interspersed between the lamp 34 and the beam splitter 22 is required to prevent the image of the lamp from being visible through the eyepiece 18.

Because of the length of cam slots 46, the occluder/lens assembly 42 may be rotated in the direction of arrow 64 by grasping knurled end 54 to move the aperture 48 from the position shown in FIG. 1 to another position where an opaque surface 74, as best illustrated in FIG. 3, would be aligned with axis 30 to block light from passing through diffusing lens 26 to beam splitter 22. Illumination from lamp 34 would therefore only pass out of the occluder/lens assembly 42 through focusing lens 56.

With end of cable 70 in place in front of objective 20, as previously described, the opposite end 76 of the fiber optic cable, which is quite frequently available to the service personnel, may be positioned before the focusing lens 56. Light transmitted through the focusing lens enters end 76 providing illumination for the entire fiber optic cable 70 as well as the optical tube assembly 14. The characteristics of the light passing through the cable 70 may be observed to determine the optical transmission of the cable.

As best illustrated in FIGS. 5 and 6, a stage 100, which supports a rotatable specimen mount 102, may be incorporated into the microscope housing 12 adjacent objective 20. The stage 100 has a bearing assembly 104 fitted to stepped aperture 106. The rotatable specimen mount 102 is fitted to bore 110 of bearing assembly 104 for rotation about axis 108. Threaded portion 112 extends through stage 100 and spring member 114, such as a bow washer, and has a shouldered thumb wheel 116 threaded thereto.

To secure the end of a fiber optic cable for examination, a bore 118 extends through specimen mount 102 perpendicular to axis 108. A slot 120 is cut through the specimen mount 102 to bore 118. A threaded aperture 122 intersecting slot 120 is formed parallel to axis 108 and has thumbscrew 124 threadedly engaged thereto. With a fiber optic cable 126 fitted to bore 118, tightening of thumbscrew 124 squeezes opposing surfaces of slot 120 together thereby securely clamping the cable 126. The distance "X" from the stage surface 128 to the centerline of bore 118, shown in FIG. 5, is calculated to insure that the cable 126 is aligned with the optical axis 24 of the microscope 10.

The specimen mount is normally positioned so that the fiber optic cable 126 is approximately axially aligned with axis 24, as best illustrated in FIG. 6. To prevent rotation thumb wheel 116 is tightened on threaded portion 112 to clamp the mount 102 to the stage 100. The bow washer 114 exerts a frictional force between stage 100 and specimen mount 102, which is threaded to thumb wheel 116. However, because mount 102 rotates about axis 108, the orientation of the end of the fiber cable 126 with respect to objective 20 may be varied which better enables inspection of the quality of the finish of the end.

The foregoing description is given by way of example only and should not be considered a limitation. It is contemplated that changes and modifications may be made in the present invention without departing from the spirit or scope thereof.

What is claimed is:

1. Apparatus for rotatably holding a fiber optic cable relative to the optical axis of a microscope to permit examination of the end of said cable, comprising:
    a support mounted to said microscope;
    first means rotatably mounted by a low friction bearing assembly received within an aperture formed in said support;
    second means for releasably securing said cable to said first means, said second means positioning said cable end relative to said optical axis; and
    third means mounted to said support and said first means for providing tension therebetween, said first means being rotatable to, and holdable in, any one of a plurality of angular positions with respect to said optical axis, whereby said cable end being examined may be viewed in a plurality of orientations relative to said optical axis without being moved relative to said second means.

2. The apparatus as set forth in claim 1, wherein said second means comprises a clamp.

3. The apparatus as set forth in claim 2, wherein said clamp is actuated by a thumbscrew.

4. The apparatus as set forth in claim 1, whereinsaid third means comprises a spring member, and means for exerting pressure on said spring member against said support.

5. The apparatus as set forth in claim 4, wherein said spring member is a bow washer.

6. The apparatus as set forth in claim 4, wherein said means for exerting pressure against said support is a thumb wheel.

* * * * *